US008096285B2

(12) United States Patent
Rottenwöhrer et al.

(10) Patent No.: US 8,096,285 B2
(45) Date of Patent: Jan. 17, 2012

(54) CIRCUIT ARRANGEMENT AND METHOD FOR OPERATING AN INJECTOR ARRANGEMENT

(75) Inventors: Klaus Rottenwöhrer, Regensburg (DE); Andreas Weigand, Regensburg (DE); Lorand de Ouvenou, Bernhardswald (DE)

(73) Assignee: Continental Automotive GmbH, Hannover (DE)

( * ) Notice: Subject to any disclaimer, the term of this patent is extended or adjusted under 35 U.S.C. 154(b) by 242 days.

(21) Appl. No.: 11/816,510

(22) PCT Filed: Jan. 26, 2006

(86) PCT No.: PCT/EP2006/050461
§ 371 (c)(1),
(2), (4) Date: Sep. 10, 2007

(87) PCT Pub. No.: WO2006/087259
PCT Pub. Date: Aug. 24, 2006

(65) Prior Publication Data

US 2008/0149072 A1 Jun. 26, 2008

(30) Foreign Application Priority Data

Feb. 17, 2005 (DE) ........................ 10 2005 007 327

(51) Int. Cl.
*F02M 51/00* (2006.01)
*G01M 15/00* (2006.01)

(52) U.S. Cl. .................................... 123/478; 73/114.47

(58) Field of Classification Search .................. 123/478, 123/472, 490, 498, 499, 480; 310/316.01, 310/317, 323.06; 239/102.2; 324/727; 73/114.47
See application file for complete search history.

(56) References Cited

U.S. PATENT DOCUMENTS 4,791,809 A * 12/1988 Schmidt .................... 73/114.47
4,793,313 A * 12/1988 Paganon et al. ............... 123/506
4,838,080 A * 6/1989 Okano ....................... 73/114.47
5,109,885 A * 5/1992 Tauscher ...................... 137/554
5,361,014 A * 11/1994 Antone et al. .......... 310/316.03
5,924,407 A * 7/1999 Iwaszkiewicz et al. ....... 123/446
6,147,433 A 11/2000 Reineke et al. .......... 310/316.03
6,349,705 B1 * 2/2002 Pirkl et al. ................... 123/490
6,487,505 B1 * 11/2002 Mock et al. .................... 702/33

(Continued)

FOREIGN PATENT DOCUMENTS

DE 3445721 7/1985

(Continued)

OTHER PUBLICATIONS

German Office Action for Application No. 102005007327.1-26 (3 pages), Oct. 10, 2005.

(Continued)

*Primary Examiner* — Stephen K Cronin
*Assistant Examiner* — Sizo B Vilakazi
(74) *Attorney, Agent, or Firm* — King & Spalding L.L.P.

(57) ABSTRACT

In a circuit arrangement (10*a*) for operating an injector arrangement (12*a*) for injecting fuel in an internal combustion engine of a motor vehicle, in order to obtain information easily as to the degree to which each valve is open when the injector arrangement is in operation, a measuring signal (S0) is superposed on a control voltage that is supplied to an actuator (Cpiezo, Rpiezo) and, based on an evaluation of the electrical properties of the actuator (Cpiezo, Rpiezo), a detection signal (S2) is produced that is representative of the position of the valve body (44*a*) relative to the valve seat (46*a*).

18 Claims, 2 Drawing Sheets

U.S. PATENT DOCUMENTS

| | | | | |
|---|---|---|---|---|
| 6,917,875 | B2 * | 7/2005 | Boysen et al. | 701/114 |
| 7,124,741 | B2 * | 10/2006 | Cagnoni et al. | 123/472 |
| 2004/0163628 | A1 * | 8/2004 | Melbert | 123/490 |
| 2005/0224050 | A1 * | 10/2005 | Schmitfranz et al. | 123/446 |
| 2006/0255302 | A1 * | 11/2006 | Aspelmayr et al. | 251/129.06 |
| 2007/0001545 | A1 * | 1/2007 | Schoor et al. | 310/317 |
| 2007/0044768 | A1 * | 3/2007 | Eick et al. | 123/478 |
| 2007/0126314 | A1 * | 6/2007 | Ohmori et al. | 310/316.01 |
| 2008/0262696 | A1 * | 10/2008 | Macua et al. | 701/103 |

FOREIGN PATENT DOCUMENTS

| | | | |
|---|---|---|---|
| DE | 19733560 | | 2/1999 |
| DE | 38 38 599 | A1 | 5/1999 |
| DE | 19804196 | | 8/1999 |
| DE | 198 14 594 | A1 | 10/1999 |
| DE | 19930309 | | 1/2001 |
| DE | 199 44 733 | A1 | 3/2001 |
| DE | 10008752 | | 9/2001 |
| DE | 10114421 | | 10/2002 |
| DE | 10120143 | | 10/2002 |
| DE | 103 19 329 | A1 | 11/2004 |
| DE | 10319530 | | 11/2004 |
| DE | 10319530 | A1 * | 11/2004 |
| DE | 10333358 | | 5/2005 |
| DE | 10359673 | | 8/2005 |
| WO | 2005/010335 | | 2/2005 |

OTHER PUBLICATIONS

International Search Report for Application No. PCT/EP2006/050461 (10 pages), May 3, 2006.

* cited by examiner

CIRCUIT ARRANGEMENT AND METHOD FOR OPERATING AN INJECTOR ARRANGEMENT

CROSS-REFERENCE TO RELATED APPLICATIONS

This application is a U.S. national stage application of International Application No. PCT/EP2006/050461 filed Jan. 26, 2006, which designates the United States of America, and claims priority to German application number 10 2005 007 327.1 filed Feb. 17, 2005, the contents of which are hereby incorporated by reference in their entirety.

TECHNICAL FIELD

The present invention relates to a circuit arrangement and a method for operating an injector arrangement.

BACKGROUND

These circuit arrangements and methods are known for example from DE 197 33 560 A1 and DE 101 20 143 A1.

In modern internal combustion engines, the control of the injection of fuel usually takes place with the help of electronic engine control devices, which actuate the injection valves in a suitable manner, so that injection nozzle bores are cleared at desired points in times by the movement of valve bodies such as nozzle needles and fuel injections take place in a combustion chamber. The more exact the movements of the valve bodies can be controlled or reproduced, the better results can be achieved regarding the engine characteristics such as performance, fuel consumption and pollutant emission level. Furthermore, tolerances regarding the above-mentioned engine characteristics can be reduced by regulating the valve body movement. A need exists therefore for the valve body movement or the position of the valve body to be detected relative to a valve seat of the fuel valve.

DE 34 45 721 A1 discloses an electrically actuable magnetic valve suitable for injecting fuel. This known magnetic valve comprises a contact switch formed of a valve body and an associated valve seat, the switching state of which thereby representing the position of the valve body relative to the valve seat. For the detection of the switching state of this on-off switch, the magnetic valve is supplied with a measuring voltage via a resistor, and the voltage drop generated at the resistor is measured. When the valve is closed, a current flows over the resistor and generates a voltage drop. However, when the valve is opened, the electrical connection between the valve body and the valve seat is interrupted, so the current flow and consequently the voltage drop at the resistor becomes zero.

DE 103 19 329 A1 discloses an injection valve which is driven for example in a piezoelectric manner, which comprises a double switch for the detection of the position of the valve body relative to the valve seat, which double switch consists of a seat contact switch (similar to the contact switch described in DE 34 45 721 A1) and additionally a limit switch, so that not only the start and the end of the movement of the valve body can be sensed during an injection, but additionally the start and the end of a valve body limit stop. These points in time which are sensed additionally correspond to the attainment of a fully open degree and the start of a reduction based on this fully open degree of the valve. The accuracy of the information regarding the position of the valve body is thereby increased.

The provision of the known contact switch for the detection of the valve position means a certain amount of additional work in the region of the fuel valve, especially as the durability or the life of these contact switches has to be ensured hereby during a use in series engines.

SUMMARY

The operation of an injector arrangement for injecting fuel in an internal combustion engine of a motor vehicle can be improved in that information regarding the valve opening degree of each valve of the injector arrangement can be obtained in a simple manner.

According to an embodiment, in a circuit arrangement for operating an injector arrangement for injecting fuel in an internal combustion engine of a motor vehicle, the injector arrangement comprises one or more injectors each formed from an electrically actuatable actuator and a fuel valve designed to be activated by means of the actuator wherein the fuel valve comprises a valve body arranged movably relative to a valve seat, the circuit arrangement is formed to optionally supply an actuation voltage to each of the injectors for actuating the actuator via a conductor arrangement, and the circuit arrangement is designed such that a measuring signal superimposes the actuation voltage and that a sensing signal is formed, based on an evaluation of the electrical properties of the actuator, which signal is representative of the position of the valve body relative to the valve seat.

According to another embodiment, a method for operating an injector arrangement for injecting fuel in an internal combustion engine of a motor vehicle, wherein the injector arrangement comprises one or more injectors each formed of an electrically actuatable actuator and a fuel valve which is activated by means of the actuator wherein the fuel valve comprises a valve body which can be moved relative to a valve seat, comprises the step of supplying an actuation voltage to each of the injectors for actuating the actuator via a conductor arrangement, wherein a measuring signal superimposes the actuation voltage and a sensing signal based on an evaluation of the electrical properties of the actuator, which signal is representative of the position of the valve body relative to the valve seat.

BRIEF DESCRIPTION OF THE DRAWINGS

The invention is explained in more detail below with reference to exemplary embodiments with regard to the appended drawings, in which.

DETAILED DESCRIPTION

Figure 1:
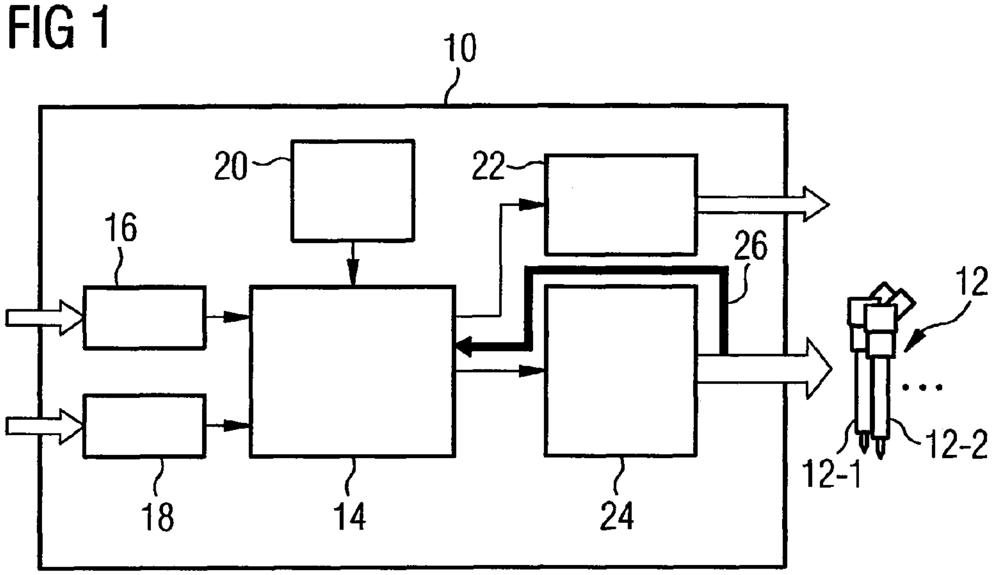
FIG. 1 shows a schematic representation of a block diagram of an injection system having a conventional configuration.

According to an embodiment, it is provided that a measuring signal superposes the actuation voltage and that a sensing signal is formed based on an evaluation of the electrical properties of the actuator, which signal is representative of the position of the valve body relative to the valve seat.

The means necessary for this can for example be combined constructionally together with the components necessary for the actuation of the actuators in an engine control device, which mainly serves to control or regulate a fuel injection quantity during the operation of the injector arrangement.

Contact switches serving specially for the detection of the valve position are dispensable according to an embodiment. The position of the valve body can be advantageously determined by means of the electrical properties of the actuator, to which is supplied a suitable measuring signal for this purpose in addition to the actual actuation signal. This electrical measuring signal can for example be an alternating voltage, in the simplest case an essentially sinusoidal alternating voltage, and/or a pulsing direct voltage. The measuring signal or a measuring signal pattern can also contain comparatively short signal pulses.

It is essential for the function of the invention that the electrical properties of the actuator depend more or less on the position of the valve body of the fuel valve which is present in the vicinity of the actuator in practice. In the invention, the actuator is also used effectively as a valve position sensor. The electrical behaviour or the electrical reaction of the actuator regarding the charge of the actuator with the measuring signal allows information regarding the position of the valve body to be obtained. The superposition of a measuring signal and the adjustment of the measuring signal form to the respective injector design hereby permits a particularly high detection accuracy. Finally, a further advantage according to an embodiment consists in that, by the superposition of the actuator voltage and the measuring signal, no additional work is necessary for the supply of the measuring signal to the actuator, but the conductor arrangement which is already present between the circuit arrangement and the injector arrangement is used for this.

The electrical properties of the actuator to be evaluated can for example comprise its electrical impedance for the measuring signal. A particularly large sensitivity of this impedance for the valve position results for example during the use of an injector with a magnetic valve, the impedance of which changes greatly with a displacement of a ferromagnetic valve body (e.g. of steel).

The measuring signal is preferably provided so that it influences the actuator actuation in any case insignificantly. Several possibilities exist for this. The measuring signal can for example have a considerably lower amplitude (e.g. 5-40% of the actuation signal amplitude) compared to the actuation voltage. With regard to the detection accuracy however, a measuring signal with a comparatively large amplitude (e.g. 40-150% of the actuation signal amplitude) is preferred. A small influence of the actuator control, even with a comparatively large measuring signal amplitude can be achieved e.g. with a measuring signal which contains one or more signal parts with a fixed frequency respectively, which is larger than the maximum actuation frequency to be expected during the operation of the injector arrangement. In particular, if the measuring signal is provided here as an alternating voltage, no disadvantageous influence on the actuation results in the chronological average. By providing several signal parts with a fixed frequency respectively, the valve position detection can be carried out with redundancy or a larger measuring accuracy. The fixed frequencies preferably is or are each at least the tenfold of the maximum actuation frequency to be expected during the operation of the injector arrangement. Alternatively or additionally, it is advantageous if this frequency or these frequencies are larger than an (electrical and/or mechanical) resonance frequency of the respective actuator.

With regard to the area of application of interest here, it is preferred if such a frequency component of the measuring signal is at least 10 KHz, in particular at least 50 KHz.

In one embodiment, it is provided that the measuring signal contains signal pulses, the duration of which is considerably shorter (e.g. at least by a factor 10) than the reciprocal of the maximum actuation frequency to be expected during the operation of the injector arrangement. In particular in this case, the formation of the sensing signal representative of the position of the valve body can essentially e.g. take place according to a type of a "radar" or "sonar", that is by analysis of the reflection of an acoustic signal (sound wave) sent from the actuator to an object (valve body), wherein the reflected acoustic signal is again converted into an electrical property or variable by means of the actuator. The use of a piezoelectric actuator is particularly interesting especially in this respect, as a piezo actuator is suited both to sending and receiving sound waves (e.g. ultrasonic waves) with high efficiency.

The superposition of the measuring signal, for example a measuring signal containing predetermined fixed frequencies, can take place in a simple manner by means of a frequency selective coupling network which couples the measuring signal generated by a signal generator to one or several conductors of the conductor arrangement provided for the actuation of the actuators. During the use of a measuring signal containing at least a relatively high frequency compared to the actuation, such a coupling network can for example be formed as a high-pass filter or a band-pass filter. For this, the measuring signal can for example be guided over a coupling capacitor.

It is further of advantage if the measuring signal to be superimposed is guided over a switch to perform the superposition at predetermined points in time and/or periods.

A so-called selector switch can for example function as such a switch which, in the case of conventional circuit arrangements for the actuation of a plurality of injectors, usually connects a conductor of an actuation conductor pair of the respective injector during the actuation to a supply potential (e.g. vehicle mass).

It can be provided hereby that the measuring signal can be transferred to the injector only at predetermined periods by means of a controllable switch (e.g. transistor), in which a displacement of the valve body can be expected. The coupling of the measuring signal can for example essentially begin periodically and respectively simultaneously with the start of an actuation cycle.

The superposition of the measuring signal can also be implemented in a simple manner as a function of the actuation circuit used for the actuation of the actuators. With these actuation circuits, which are usually formed as part of an engine control device, an actuation signal is often defined or given by a control unit, e.g. based on currently measured and/or determined operating parameters of the injection system or the internal combustion engine. The actuation signal thus generated is then input into a performance end stage for the control or regulation of the same. With such actuation circuit concepts known per se, the measuring signal superposition according to an embodiment can be realised in a comparatively simple manner in that this superposition is already considered in the definition of the actuation signal (that is e.g. in the mentioned control unit). An output stage which is arranged downstream of the control unit can then be formed in an entirely conventional manner.

In particular for a measuring signal containing one or more fixed signal frequencies, the evaluation of the electrical properties of the actuator can comprise a frequency filtering of a signal (e.g. voltage) tapped by the conductor arrangement. By way of example, this can take place again by a frequency selective coupling network, with which the frequency components contained in the measuring signal are specifically filtered out to evaluate these, e.g. by measurement of their amplitude. The evaluation can, alternatively to such a frequency filtering, also take place by the use of a Fourier analysis, e.g. a Fourier analysis carried out in a programme-controlled manner in a micro controller (e.g. in the engine control device).

As has already been mentioned above, it is advantageous for many injector designs if the evaluation takes place with consideration of a sound runtime delay. A sound runtime can hereby be considered in two respects. On the one hand, it has to be considered that an emission of a sound wave which is caused by the measuring signal needs a certain time to move to the valve body and to be reflected there. On the other hand, the sound wave signal which is reflected there again needs a certain time until it reaches the actuator and changes its electrical properties or generates a reaction signal there which can be measured. In this case, during the evaluation, the measuring signal of a certain point in time should be correlated with the evaluation result of the electrical properties of the actuator at a later (delayed) point in time, wherein the time difference which is important for this corresponds to the double (to and fro) sound runtime. Furthermore, it has to be considered that the evaluation of the change of the electrical properties affected by the reflection of a sound wave signal is representative of the position of the valve body at a point in time which trails by the amount of a simple sound runtime.

Depending on the concrete design of the injector it is feasible to combine the afore-described detection principle of the analysis of a reflected sound wave signal with practically delay-free functioning principles, like for instance the change of the environment of the actuator regarding electrical and/or magnetic fields caused by a displacement of the valve body.

The sensing signal formed by the evaluation can advantageously be used with the control or regulation of a fuel injection quantity during the operation of the injector arrangement. By a time-dissolved analysis of the electrical properties of the actuator, for example an analysis of the relationship between sent and received signal patterns, the position of the valve body can be determined at any arbitrary point in time, without special contact switches provided for this being necessary. The circuit arrangements and methods according to various embodiments have the advantage of a high durability with simultaneous low costs. Different from use of contact switches, any constructive changes to the injector arrangement, in particular the hydraulic components, are not necessary. Furthermore, for injector constructions, which already include actuators (e.g. piezo elements) for the activation of the fuel valve, the same actuators can be used for the determination of the valve body positions or the valve body movements without a considerable further effort.

According to various embodiments, the information obtained by means of the measuring signal superposition and reaction signal evaluation regarding the position of the valve body and thereby the valve opening degree can for example be used for the precise regulation of the fuel quantity to be injected. Due to growing demands on modern internal combustion engines regarding fuel consumption, exhaust gas emission, noise development, performance etc., the regulation of the fuel quantity to be injected has gained enormous importance in practice, as an unregulated actuation would often lead to unacceptably high injection quantity dispersions, caused by relative large tolerances with injectors produced in serial production. A compensation of these dispersions within the scope of an injection regulation nevertheless assumes a sufficiently exact sensing or determination of the chronological sequence of the injection. According to an embodiment, the evaluation of the actuator reaction provides suitable data for this on a given measuring signal pattern. Depending on the effort of the evaluation, not only the points in time of the injection start and the injection end (valve body rests on the valve seat) can be determined, but the entire injection course and thereby the injection quantity can be reconstructed more or less accurately. It is in principle feasible to combine the method according to the invention with the use of the contact switches mentioned above, which are known per se, either to increase the detection accuracy (by a redundant evaluation) or to determine specially suitable points in time and/or periods for the generation or superposition of the measuring signal (e.g. "timing" of measuring signal pulses).

The particular manner of the delivery of the measuring signal for detecting the valve body position is furthermore essential for the invention. In the state of the art (see e.g. DE 34 45 721 A1), further conductors were provided for the supply of a measuring voltage (to a specially provided sensor in the form of a contact switch) in addition to the existing actuator actuation conductors. Even when a contact of the contact switch was connected to the vehicle mass in the region of the injector arrangement, a further conductor per injector was necessary for the supply of a measuring voltage according to this present method. This means with a four cylinder internal combustion engine, that at least four additional conductors together with respective interfaces have to be provided by an engine control device which is usually arranged remote from the injector arrangement, which means considerable additional work. In contrast, according to an embodiment, a conductor which is already provided for the supply of the actuation voltage is additionally used for the supply of the measuring signal. The detection of the valve position according to an embodiment does thereby not require any additional effort in the region of the conductor arrangement between for example an engine control device and the injector arrangement arranged remote therefrom.

According to various embodiments, the detection of the valve position is enabled in a cost-efficient manner with injection systems, where a detection of the valve position and thereby an exact regulation of the injection process had been forgone up to now for avoiding the additional "wiring effort". Storage injection systems such as so-called "Common rail" diesel injection systems for series-production vehicles often only have one control up to now, where the data for the determination of the injection rate and the injection quantity are drawn from characteristic diagrams which are stored in a control device and which are based on the measured values regarding the operation characteristic of the fuel injection valves used. The advantages of such systems can be maintained with the invention and furthermore, a more accurate regulation of the injection process can be realised, so that in particular especially small injection quantities can be adjusted in a very accurate manner or even checked. Characteristic diagrams can also be used according to various embodiments, e.g. to supply an evaluation result as a function of an actuator reaction signal.

In one embodiment, at least a part of the components used for the generation of the actuation voltage is combined in a control device, which is provided to be arranged remote from the injector arrangement in the motor vehicle. In this case, the components which are used for the generation and the coupling of the measuring signal and for the branching off of a "reaction signal" of the actuator can also be integrated advantageously in the control device. Finally, the components with which the evaluation of the electrical properties of the actuator is performed in reaction to the measuring signal can be advantageously accommodated in such a control device. Such an evaluation takes place in a simple embodiment by analysis of the voltage and/or the current at any position of the conductor charged with the measuring signal. So as not to influence the actuation signal in a disadvantageous manner by this voltage or current measurement, a reaction signal can be guided at the respective conductor position via a suitable decoupling capacitor which does not represent an impairment for an actuation signal formed in particular essentially as direct current or comparatively low frequency.

FIG. 1 shows a circuit arrangement in the form of an engine control device 10 for operating an injector arrangement 12 for injecting fuel in an internal combustion engine of a motor vehicle. Two injectors 12-1 and 12-2 are only shown in an exemplary manner in the figure. The internal combustion engine can generally comprise several cylinders with respectively one or more injectors per cylinder for instance.

The engine control device 10 comprises in an essentially known manner a micro controller 14 into which can be entered input parameters as e.g. measured or determined operating parameters of the internal combustion engine and/or of other components of the motor vehicle via analog inputs 16 and digital inputs 18. With these input parameters, the micro controller 14 which is supplied by means of a voltage supply 20 generates suitable output parameters which are needed for the control of various components of the internal combustion engine or of the vehicle. Part of these output parameters is output via small performance outputs 22 for the actuation of components having a smaller performance, as for the actuation of a throttle valve etc. Another part of these output signals forms an input signal for an injector actuation end stage 24, which generates the comparatively large actuation voltages or actuation currents necessary for the actuation of the injector arrangement 12. These actuation signals are supplied to electrically actuable actuators via a conductor arrangement arranged between the engine control device 10 and the injector arrangement 12, which each, together with a fuel valve which can be activated by means of the actuator, form one of the injectors 12-1, . . . .

The end stage 24 used hereby can be realised in various ways. Suitable circuit concepts are generally known to the person skilled in the art and do thus not need a detailed explanation. Such an end stage is for example known from DE 198 14 594 A1 and is based on a half bridge end stage which actuates the piezo element of an injector via an inductor (throttle), whereby this throttle mainly serves for limiting the charging current occurring during charging and the discharge current occurring during discharging. Another end stage is known e.g. from DE 199 44 733 A1 and is based on a blocking oscillator type converter operated in a bi-directional manner which enables an exact admeasurement of energy portions during the charging and discharging of a capacitative actuator, so that almost any averaged current courses can be realised during the charging and discharging of a capacitative actuator. Further end stages are for example already known from the afore-mentioned DE 197 33 560 A1 and DE 101 20 143 A1.

For an admeasurement of a fuel injection quantity during the operation of the internal combustion engine which is as accurate as possible, it has proven to be advantageous that the activation and the deactivation of the actuator built into the injector, e.g. the charging and discharging of a piezo actuator takes place in a regulated manner by means of a target provided by the micro controller 14. By such a regulated actuation of the actuators, better defined and reproducible injection processes can be achieved. For the realisation of such a regulation of the actuator actuation, the actuator voltage at an actuator and/or the actuator current flowing through an actuator are usually measured in the exit region of the end stage 24, to determine deviations during the activation and deactivation of the actuator from the target and to use them within the scope of the regulation.

Such a "feedback" or refeed of measured output parameters of the end stage 24 is symbolised in FIG. 1 with an arrow 26. This feedback 26 serves exclusively for the regulation of the actuation signal in conventional engine control devices.

It is however disadvantageous with the generally known regulation that the chronological sequences of the actuator voltage or of the actuator current represent the behaviour of the fuel valve and thereby the chronological sequence of the actual fuel injection rate only inadequately. For a more accurate regulation of the fuel injection quantity, it is therefore desirable to have time-dissolved information regarding the position of the valve body relative to the valve seat of each fuel valve. Such information regarding the actual present valve opening degree is obtained with the embodiment described in the following with regard to FIG. 2 without any considerable additional work. In the following description, the same reference numerals are used for components working in the same manner, each complemented by the small letter "a". Thereby, only the differences of the embodiment described with reference to FIG. 1 are discussed and furthermore one refers expressly to the previous description.

Figure 2:
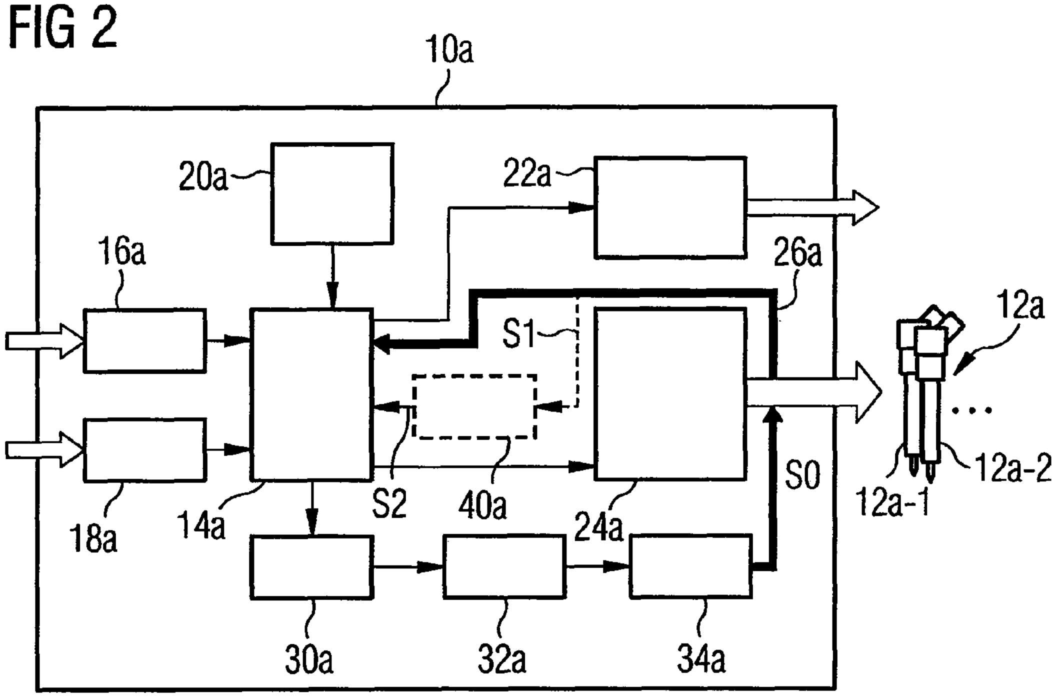
FIG. 2 shows a schematic representation of a block diagram of an injection system corresponding to FIG. 1 with an actuation circuit arrangement according to an embodiment.

FIG. 2 shows an engine control device 10*a* according to an embodiment for operating an injector arrangement 12*a*, wherein its injectors 12*a*-1, . . . are again each formed from an electrically actuable actuator and a fuel valve which can be activated by means of the actuator, which valve comprises a valve body (valve needle) which moves relative to a valve seat of the fuel valve corresponding to the actuation.

As with the embodiment described above, an actuation voltage for actuating the actuator is optionally supplied to each of the injectors 12*a*-1, . . . via a conductor arrangement, and a measurement signal representative of the actuator voltage and/or the actuator current is returned to a micro controller 14*a* (arrow 26).

A special feature of the engine control device 10*a* is that an additional measuring signal S0 superimposes the actuation voltage supplied to the actuator and that a sensing signal S2 is formed based on the time-dissolved evaluation of the electrical properties of the actuator, which is representative of the present position of the valve body relative to the valve seat and is used during the regulation of the fuel injection by the micro controller 14*a*. To this end, the engine control device 10*a* comprises a signal generator 30*a* controlled by the micro controller 14*a* for the generation of a sinusoidal alternating current signal with a fixed given frequency of for example 50 KHz, an amplifier 32*a* for amplifying the signal emitted from the signal generator and a coupling network 34*a* for coupling the measuring signal S0, which is provided as measuring voltage, to the conductor arrangement which runs from the end stage 24*a* to the injector arrangement 12*a*, so that the respectively operated actuator receives a relatively high-frequency measuring signal which thereby influences the actuator actuation only insignificantly.

With the chosen frequency of 50 KHz, the superimposed measuring voltage S0 also lies above a mechanical resonance frequency of the actuators of the injectors 12*a* formed as piezo actuators here and can thereby be easily damped. The measuring signal does not contribute anything to the stroke of the piezo actuators. By the property of the easy dampability, every mechanical change in the environment of the piezo actuator will have an effect on the mechanical vibrations which are emitted from the piezo actuator and are reflected into its environment. This change in the “acoustic impedance” of the system can for example be determined by measuring the amplitude of the measuring signal present in the region of the conductor arrangement and can be used for the recovery of information relating to the position of the valve body relative to the valve seat. For the purpose of such an evaluation of the electrical actuator properties, the actuator voltage and/or the actuator current are specifically evaluated on the measuring signal with regard to a reaction of the piezo actuator. This evaluation can e.g. be performed within a micro controller 14*a*. Alternatively, an evaluation unit 40*a* can be provided specially for this (dashed in FIG. 2). In the last case, a relief of the micro controller 14*a* results, which is only supplied with the result of the evaluation from the evaluation unit 40*a* for use in the regulation of the fuel injection quantity.

The evaluation unit 40*a* can hereby for example monitor the amplitude course of the superimposed measuring signal frequency in a frequency-selective and in a time-dissolved manner and can detect deviations from a previously stored or pre-programmed target course and convert into the sensing signal S2 which is representative of the valve position.

In the embodiment shown, the measuring signal generated from the signal generator 30*a* can be adapted to the respective injector design by means of the amplifier 32*a* and can be brought to a comparatively high level, as a disadvantageous influence of the actuator actuation is already avoided by the comparatively high measuring signal frequency. The coupling network 34*a* couples the output signals of the amplifier 32*a* to the injectors 12*a* if necessary, without disturbing the actual actuation. The micro controller 14*a* hereby effects the activation or timing of the measuring signal generation and measuring signal coupling in a program-controlled manner. Furthermore, it is feasible that the micro controller 14*a* adjusts the frequency (or several frequencies) of the measuring signal to be generated from the signal generator 30*a*.

Figure 3:
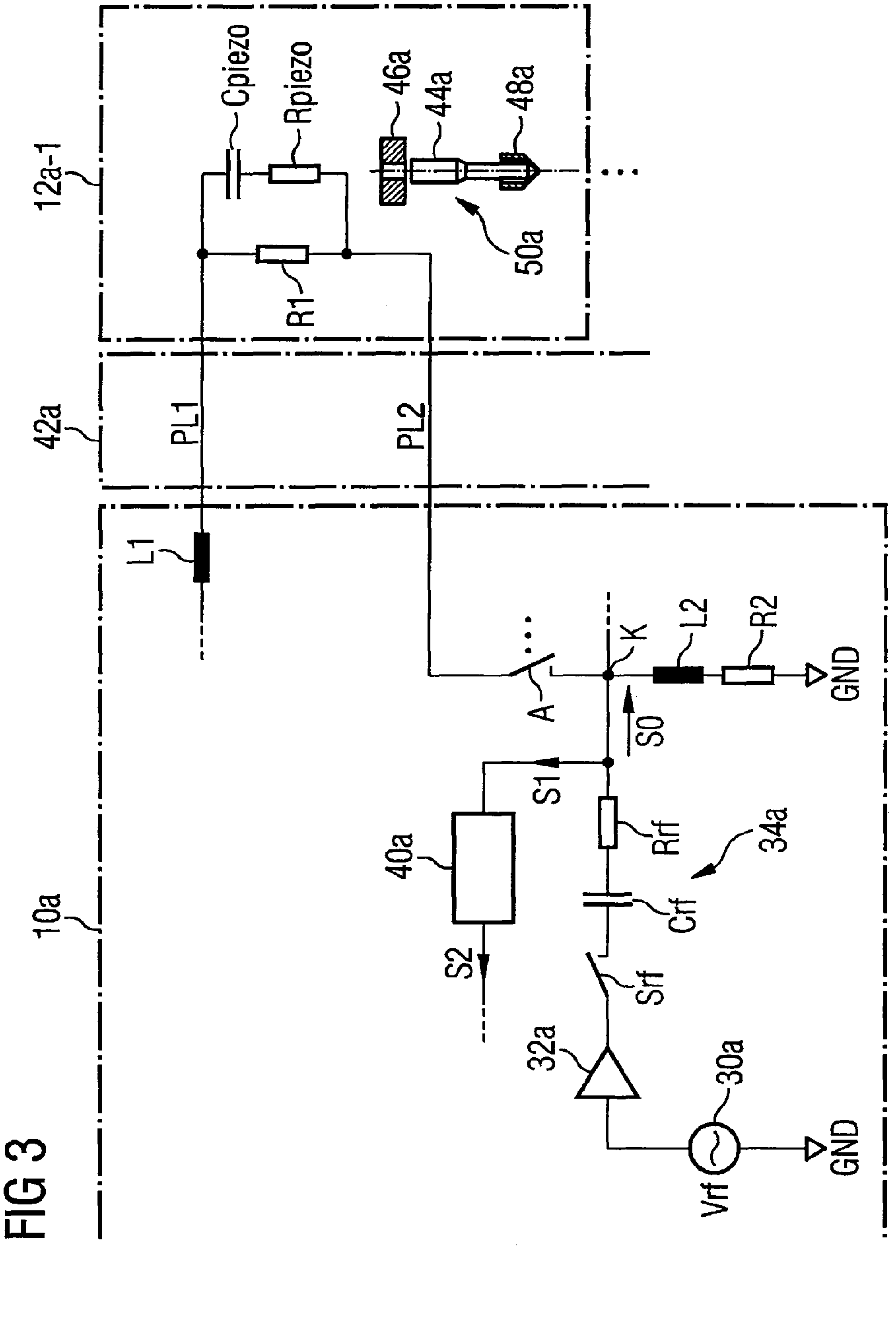
FIG. 3 is a block diagram of some components of the injection system of FIG. 2 which are essential for the understanding of the invention.

FIG. 3 provides a more detailed illustration of some components of the injection system of FIG. 2 which are essential to the understanding of the invention.

In this figure, a part of the engine control device 10*a* is recognised, which is connected to the piezoelectrically driven injector 12*a*-1 via an actuator conductor pair PL1, PL2 of a conductor arrangement 42*a*. The piezo actuator of the injector 12*a*-1 is hereby symbolised by the equivalent circuit diagram of a series connection of a piezo capacity Cpiezo and a piezo resistor Rpiezo. The resistor R1 arranged in parallel to this is a separate built-in protective resistor which prevents a damage of the actuator by an inadmissibly high electrostatic charge during the mounting of the injector.

A change in length of a piezoelectric ceramic element is effected in a manner known per se during the operation of the injection system by charging and discharging the piezo capacity Cpiezo, which once again effects a corresponding displacement of a nozzle needle 44*a* (valve body) between a stop ring 46*a* and a valve seat 48*a* of the fuel valve 50*a*.

During the actuation of the injector 12*a*-1, a charge of the actuator with a comparatively high potential (typically about 50-200 V) takes place over the conductor PLI, wherein an actuator current is limited by a throttle coil LI arranged at the output of the end stage 24*a*. The first conductor PLI could be used for all connected injectors 12*a*-1 . . . . It is alternatively possible that a separate first actuation conductor is provided for each of the injectors 12*a*-1, . . . .

The second actuation conductor PL2 connects a further actuator connection to an electric mass GND of the motor vehicle at least during the actuation of the respective actuator. Such a second conductor or mass conductor is also respectively provided for the further injectors, not shown, wherein a so-called selector switch such as the switch A drawn in the figure is arranged in the conductor course, by means of which the conductor can be optionally interrupted. The selector switch arrangement enables thereby an optional supply of the actuation voltage generated by the end stage 24*a* to each of the injectors 12*a*-1, . . . .

During the actuation of the injectors 12*a*-1, . . . the actuator voltage and the actuator current are measured. The measurement of the actuator current hereby takes place by the measurement of a voltage drop at a current measuring resistor R2 which is arranged in the example shown in a series connection with a second coil L2 in a mass path common for all injectors 12*a*-1, . . . .

At a selector switch side end of this mass path is arranged a circuit node K from which run the individual second connection conductors PL2 together with respective selector switches A to the injector arrangement 12*a*.

The coupling of the measuring signal S0 provided for the detection of the valve position also takes place at this circuit node K. The measuring signal S0 is produced as a sinusoidal alternating voltage Vrf and is guided to the circuit node K via the amplifier 32*a* and a suitable coupling network. In the exemplary embodiment shown, this coupling network consists of a series connection of a measuring activation switch Srf, a coupling capacitor Crf and a resistor Rrf. The measuring activation switch Srf is formed e.g. as a field effect transistor such as the selector switch A and is switched on and off by the micro controller 14*a*. In the periods given by the micro controller 14*a*, a coupling of the measuring voltage S0 takes place by closing the activation switch Srf. This measuring voltage S0, which hardly influences the actuation process, effects the radiation of body sound waves at the selected piezo actuator which are reflected inter alia at the nozzle needle 44*a* and are converted again into an electrical “response signal” after a certain runtime delay by the same piezo actuator by means of the piezoelectric effect. This electrical reaction (chronological delay and form of the electrical reaction signal) depends on the position of the nozzle needle 44*a* relative to the valve seat 48*a* (“acoustic impedance”). The valve position influences in particular e.g. the mechanical damping of the actuator vibration effected by the measuring signal S0. A detection of the valve position can thereby take place based on an analysis of the electrical answer. In the exemplary embodiment shown, the voltage course S1 prevailing at the circuit node K is guided to the evaluation unit 40*a* for this purpose (e.g. via a decoupling capacitor) and is analysed there. The result of this evaluation is provided as a sensing signal S2 to the micro controller 14*a*, as described with reference to FIG. 2, to gain information regarding the valve position.

In the example shown, e.g. a frequency-selective filter is suitable as input stage of the evaluation unit 40*a* for filtering the voltage parts which correspond to the used measuring frequency. By a following amplitude measurement at the filtered reaction signal S1, conveniently under consideration of a runtime delay depending on the design of the injectors 12*a*, conclusions can then be drawn regarding the valve position or the opening degree of the fuel valve 50*a*. Different from the embodiment shown, several different measuring signal frequencies could also be coupled for this and the reaction of the actuator could be analysed afterwards.

By the analysis of the actuator reaction or the emitted and received signal patterns, the positions of the nozzle needles can be determined at any arbitrary time without any substantial constructive additional work. The detection system can be realised at low costs and can operate very reliably over a long life, as contact switches which are prone to wear and/or are elaborate are dispensible for sensing the valve position.

What is claimed is:

1. A circuit arrangement for operating an injector arrangement for injecting fuel in an internal combustion engine of a motor vehicle, wherein the injector arrangement comprises one or more injectors each formed from an electrically actuatable actuator and a fuel valve designed to be activated by means of the actuator wherein the fuel valve comprises a valve body arranged movably relative to a valve seat, wherein the circuit arrangement is formed to optionally supply an actuation voltage to each of the injectors for actuating the actuator via a conductor arrangement, and wherein the circuit arrangement is designed to superimpose a measuring signal onto the actuation voltage, such that the actuation voltage and superimposed measuring signal are applied to the actuator, and such that a sensing signal is formed which is representative of the position of the valve body relative to the valve seat, wherein an evaluation of the sensing signal comprises determining, a runtime delay of sound waves generated by the actuator and reflected at a nozzle needle of the fuel valve.

2. The circuit arrangement according to claim 1, wherein the measuring signal contains one or more signal portions with a respectively fixed frequency which is larger than the maximum actuation frequency to be expected during the operation of the injector arrangement.

3. The circuit arrangement according to claim 2, wherein the fixed frequency is at least tenfold of the maximum actuation frequency to be expected during the operation of the injector arrangement and/or larger than a resonance frequency of the actuator.

4. The circuit arrangement according to claim 1, wherein the measuring signal contains signal pulses, the duration of which is considerably shorter than the reciprocal of the maximum actuation frequency to be expected during the operation of the injector arrangement.

5. The circuit arrangement according to claim 1, wherein the actuator is a piezoelectric actuator.

6. The circuit arrangement according to claim 1, wherein measuring signal is superimposed by means of a frequency-selective coupling network.

7. The circuit arrangement according to claim 1, wherein the measuring signal to be superimposed is guided over a switch to perform the superposition at predetermined points in time and/or periods.

8. The circuit arrangement according to claim 1, wherein the evaluation of the electric properties of the actuator comprises a frequency filtering of a voltage tapped by the conductor arrangement.

9. The circuit arrangement according to claim 1, wherein the evaluation of the electrical properties of the actuator comprises a Fourier analysis of a voltage tapped by the conductor arrangement.

10. The circuit arrangement according to claim 1, wherein during the operation of the injector arrangement, the sensing signal is used with the control or regulation of a fuel injection quantity.

11. A method for operating an injector arrangement for injecting fuel in an internal combustion engine of a motor vehicle, wherein the injector arrangement comprises one or more injectors each formed of an electrically actuatable actuator and a fuel valve which is activated by means of the actuator wherein the fuel valve comprises a valve body which can be moved relative to a valve seat, the method comprising, for at least one actuator:

generating an actuation voltage for actuating the actuator via a conductor arrangement, superimposing a measuring signal onto the actuation voltage, supplying the actuation voltage and superimposed measuring signal to the actuator, wherein the measuring signal supplied to the actuator generates sound waves which are reflected at a nozzle needle of the fuel valve to form a sensing signal, measuring said sensing signal, and determining a position of the valve body relative to the valve seat by determining a runtime delay of the reflected sound waves.

12. A method for operating an injector arrangement for injecting fuel in an internal combustion engine of a motor vehicle, wherein the injector arrangement comprises one or more electrically actuatable injectors each comprising an actuator and a fuel valve, wherein the fuel valve comprises a valve body arranged movably relative to a valve seat, the method comprising, for at least one actuator:

generating an actuation voltage for actuating the actuator via a conductor arrangement, superimposing a measuring signal onto the actuation voltage, supplying the actuation voltage and the superimposed measuring signal to the actuator, and wherein the measuring signal superimposed on the actuation voltage generates sound waves which are reflected at a nozzle needle of the fuel valve to form a sensing signal, and determining a position of the valve body relative to the valve seat based on a runtime delay of the sensing signal.

13. The method according to claim 12, wherein the measuring signal contains one or more signal portions with a respectively fixed frequency which is larger than the maximum actuation frequency to be expected during the operation of the injector arrangement.

14. The method according to claim 13, wherein the fixed frequency is at least tenfold of the maximum actuation frequency to be expected during the operation of the injector arrangement and/or larger than a resonance frequency of the actuator.

15. The method according to claim 12, wherein the measuring signal contains signal pulses, the duration of which is considerably shorter than the reciprocal of the maximum actuation frequency to be expected during the operation of the injector arrangement.

16. The method according to claim 12, wherein the actuator is a piezoelectric actuator.

17. The method according to claim 12, wherein measuring signal is superimposed by means of a frequency-selective coupling network.

18. The method according to claim 12, wherein during the operation of the injector arrangement, the sensing signal is used with the control or regulation of a fuel injection quantity.

* * * * *